United States Patent [19]

Steinke et al.

[11] Patent Number: 5,046,447
[45] Date of Patent: Sep. 10, 1991

[54] LIMIT SENSING INDICATOR

[75] Inventors: Karl O. Steinke, Renton; Milton R. Knight, Kirkland, both of Wash.

[73] Assignee: Sundstrand Data Control, Inc., Redmond, Wash.

[21] Appl. No.: 525,389

[22] Filed: May 17, 1990

[51] Int. Cl.$^5$ .................. H01K 1/14; H01K 11/06
[52] U.S. Cl. ................... 116/217; 374/144; 374/160
[58] Field of Search ............... 374/160, 144; 116/218, 116/217, 272, 281

[56] References Cited

U.S. PATENT DOCUMENTS

| | | |
|---|---|---|
| 2,508,510 | 7/1946 | Gillespie . |
| 2,952,238 | 9/1960 | Barber . |
| 2,953,921 | 9/1960 | Muncheryan . |
| 3,062,989 | 11/1962 | Schultz et al. . |
| 3,187,711 | 6/1965 | Campolong ............ 116/267 |
| 3,401,666 | 9/1968 | Munroe . |
| 3,452,706 | 7/1968 | Vogt . |
| 3,559,615 | 2/1971 | Kliewer . |
| 3,595,200 | 7/1971 | Cilento ................. 116/267 |
| 3,626,897 | 12/1971 | Kliewer . |
| 3,693,579 | 9/1972 | Kliewer ................ 116/218 |
| 4,220,300 | 9/1980 | Reicher et al. . |
| 4,818,119 | 4/1989 | Busch et al. . |

FOREIGN PATENT DOCUMENTS 64941 10/1892 Fed. Rep. of Germany .
0620354 5/1961 United Kingdom ............... 116/218

Primary Examiner—Daniel M. Yasich
Attorney, Agent, or Firm—Mason, Kolehmainen, Rathburn & Wyss

[57] ABSTRACT

A limit sensing device for permanently indicating when a predetermined temperature limit has been reached in a fluid conduit, includes a housing mounted on the conduit in heat transmitting relation with the fluid and an indicator movable in the housing between a retracted position and an activated, non-resettable, extended position to provide a visual indication that the predetermined temperature limit has been reached. The indicator is biased outwardly towards the activated position and a retainer in the form of a separate and discrete annulus formed of fusible material normally secures the indicator in the retracted position within the housing against the force of a biasing spring until the predetermined temperature has been reached causing the retainer to melt or fuse and thereby release the indicator to move outwardly to the extended position providing a visual indication signaling that an overtemperature condition has been reached in the fluid conduit.

21 Claims, 5 Drawing Sheets

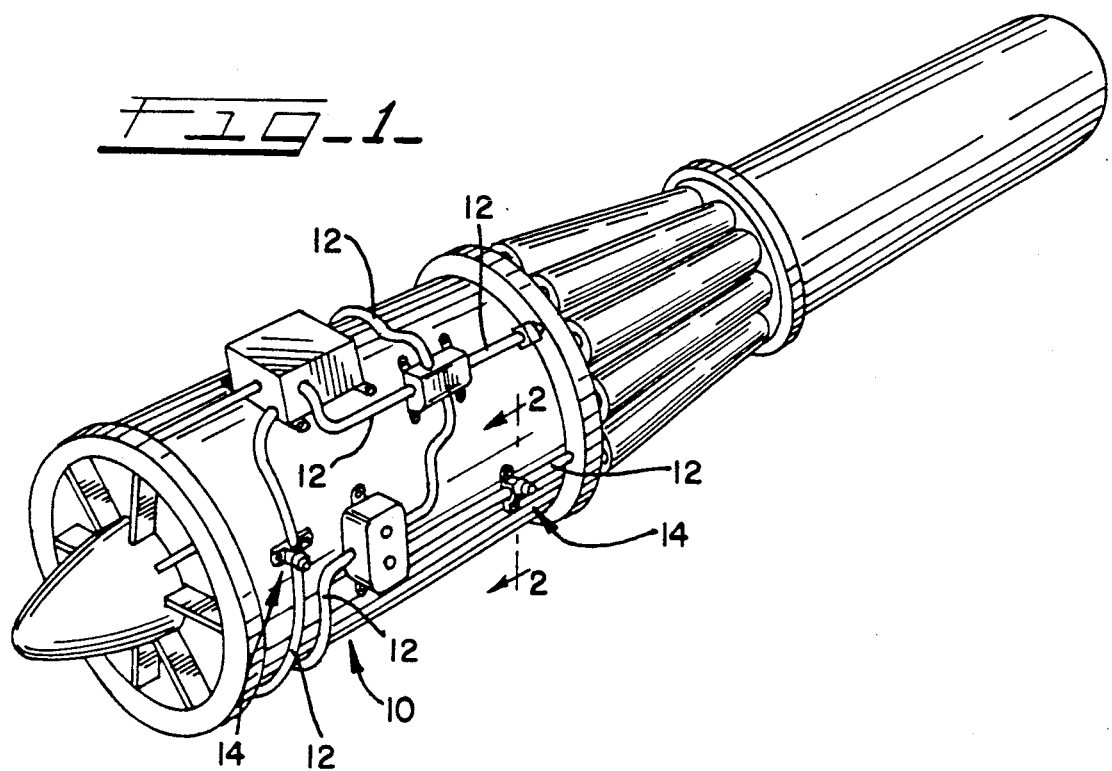
Fig_1_
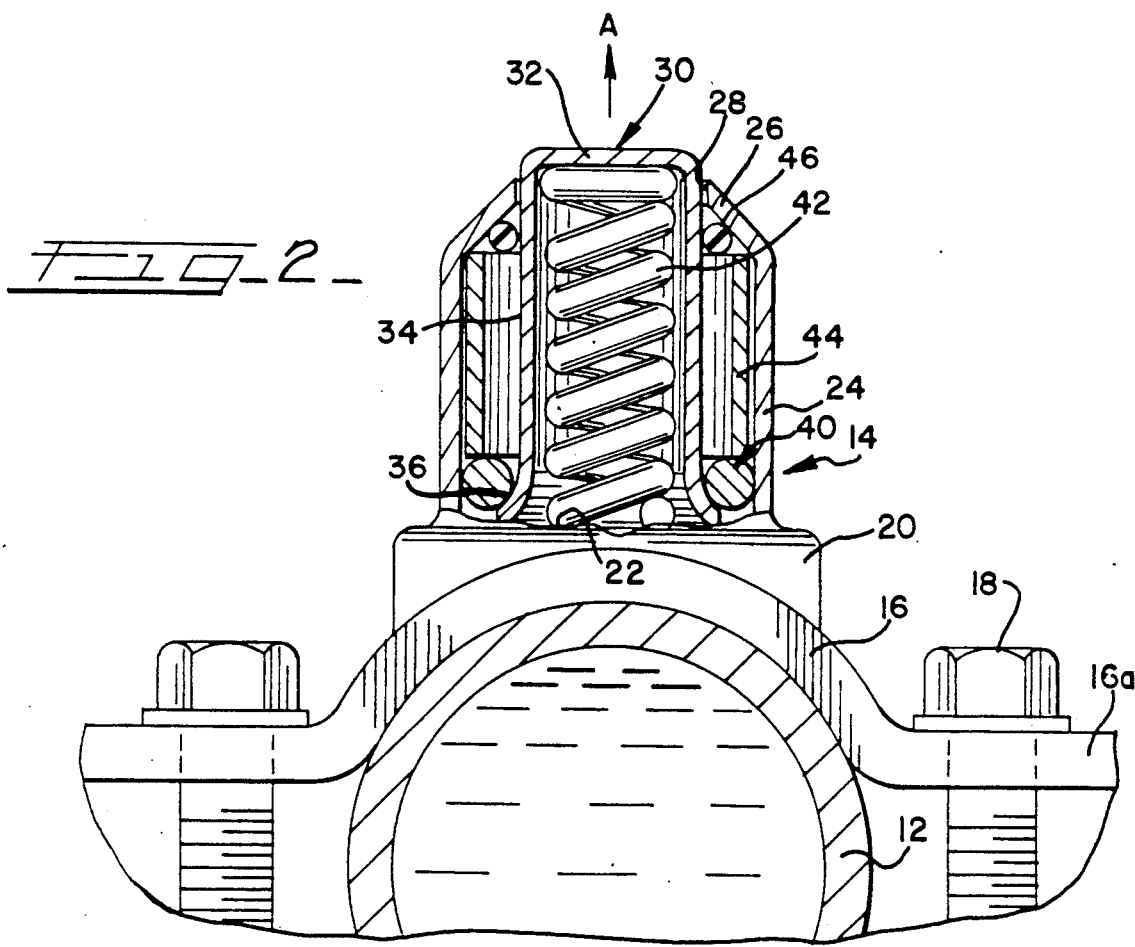
Fig_2_

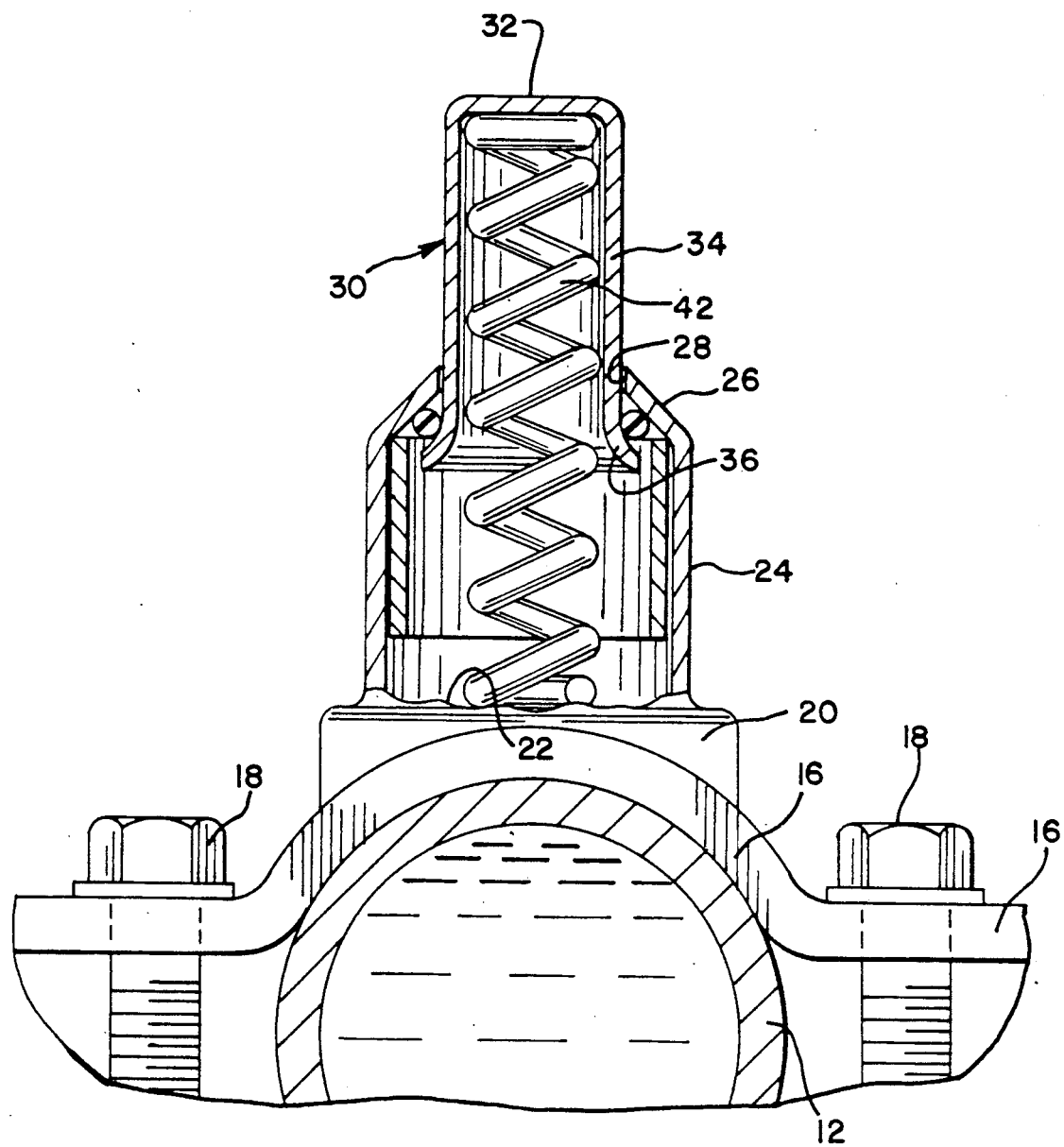
FIG_2A_

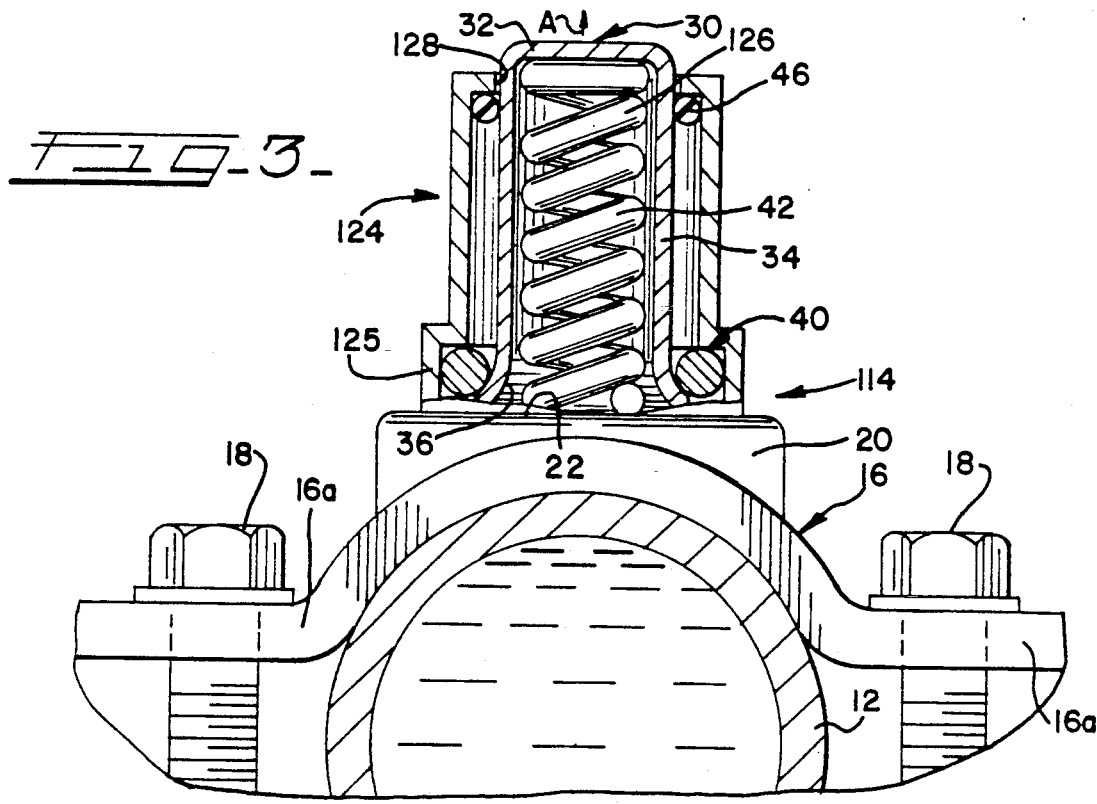
FIG-3-
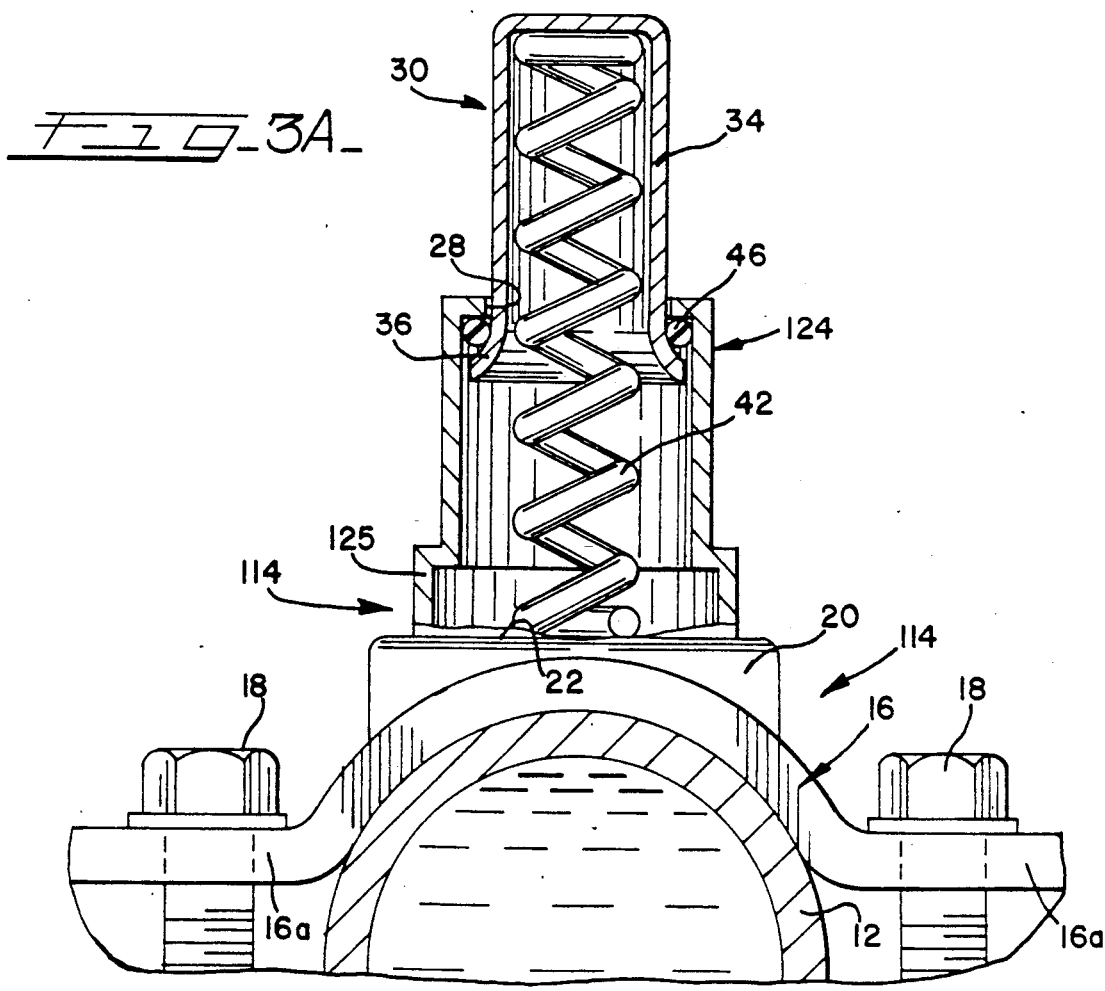
FIG-3A-

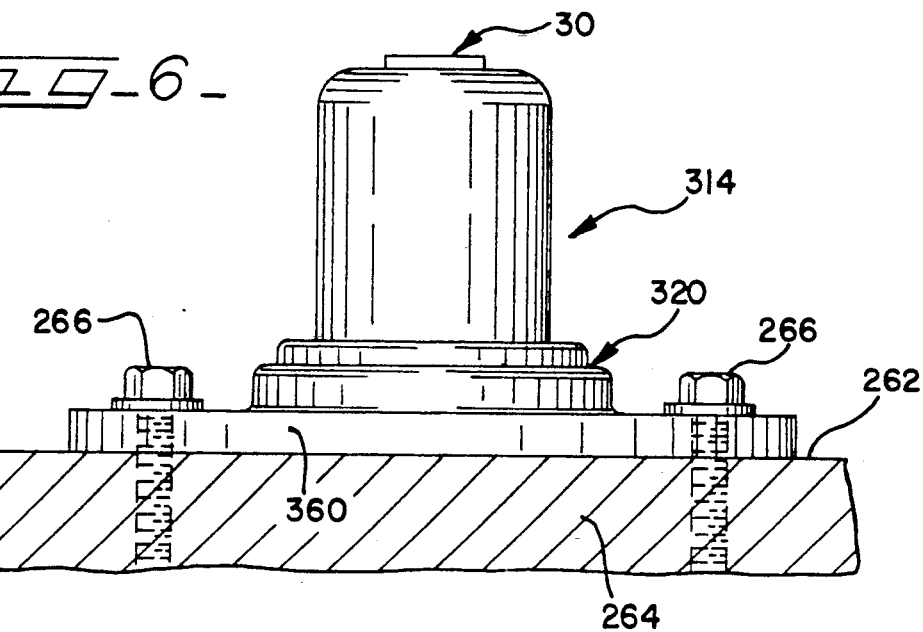
FIG-6-
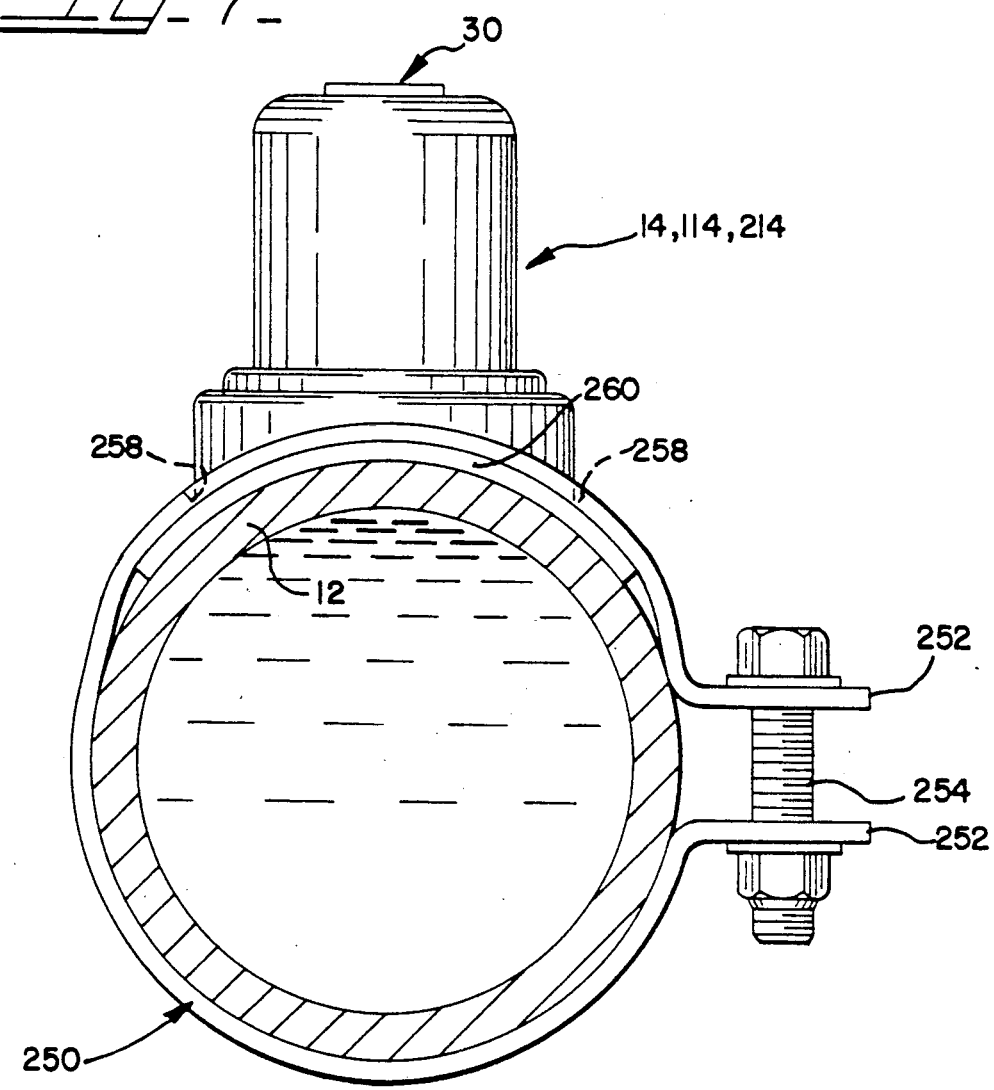
FIG-7-

LIMIT SENSING INDICATOR

BACKGROUND OF THE INVENTION

1. Field of the Invention

The present invention relates to limit sensing devices and more particularly to non-resettable, overtemperature sensing devices for indicating when a predetermined temperature limit has been reached in a fluid conduit. The sensing device is particularly designed for applications on aircraft engines including jet engines where it is desirable and indeed, critical in some instances, to determine whether or not a particular fluid line or engine part has exceeded a specific operating temperature.

Moreover, it is desirable that the limit sensing indicator be tamper-proof so that it cannot be accidentally or intentionally reset and thereby will always provide a positive indication of whether or not a particular limit has been reached or exceeded. The limit sensing indicator of the present invention has to be rugged to be useful in a harsh environment such as that encountered on a jet aircraft engine, or the like and in addition, must be highly reliable to assure that no false overtemperature indications are given as well as insuring that a true indication is provided when a critical overtemperature condition does, in fact, occur.

2. Brief Description of the Prior Art

Over the years, a variety of different chemical and/or mechanical systems have been provided for sensing and indicating the occurrence of a temperature limit being reached. However, none have been particularly well suited for the rough and harsh environmental conditions that obtain in jet engine applications and the like, wherein high temperatures as well as extremely low temperatures are alternately encountered in relatively short spans of time. In addition to temperature changes, rapid changes in pressure, physical orientation and G-forces are normally encountered and these conditions must not affect the operational characteristics and reliability of the temperature limit sensing function.

Gillespie Patent No. 2,508,510 is directed towards an attachment for railroad car journal boxes which provide a system for stopping a train when a wheel axle journal becomes heated to a predetermined degree. Vogt Patent No. 3,452,706 is directed towards a temperature indicating device for providing a visual indication of a specific or abnormal temperature condition. U.S. Pat. No. 3,062,989 discloses a capacitor protective circuit and apparatus for protecting a voltage regulator capacitor in a distribution transformer from excessively high voltage build-ups.

German Patent No. 64941 discloses a hot box indicator wherein a washer of fusible metal is used to retain a stud-like plunger against the force of a spring. Barber, U.S. Pat. No. 2,952,238 discloses a hot bearing signal device wherein metallic bonding material such as solder is used to retain the flange of an indicator in a retracted position against the action of a coiled spring. Muncheryan U.S. Pat. No. 2,953,921 discloses a temperature indicating device and closure cap utilizing a bi-metal part to provide the impetus for moving a colored indicator in response to temperature changes. Munroe U.S. Pat. No. 3,401,666 discloses a temperature detecting actuator for bearings employing a sleeve bonded to a body member by a thin film of fusible material. Kliewer U.S. Pat. Nos. 3,559,615 and 3,626,897 disclose temperature signalling devices employing a slug of fusible material for restraining an indicator against torsional loading. Reicher et al U.S. Pat. No. 4,220,300 discloses a thermal monitor for railroad wheels employing a lead washer which melts when overheated forming an open cavity, and Busch et al U.S. Pat. No. 4,818,119 discloses a hot bearing warning bolt having a fusible element mounted in the head of the bolt.

OBJECTS OF THE PRESENT INVENTION

It is an object of the present invention to provide a new and improved temperature limit sensing device for permanently indicating when a predetermined temperature limit has been reached.

More specifically, it is an object of the present invention to provide a limit sensing device for positively and accurately indicating when a predetermined limit has been reached in a fluid flowing in a fluid conduit on a jet aircraft engine and/or other types of internal combustion engines, furnaces, electric motors, air conditioning systems, hydraulic pumps, etc.

Yet another object of the present invention is to provide a new and improved temperature limit sensing device which is relatively low in cost and yet which is extremely accurate in assuring that no false indications are given and that indeed, a true indication is given should an overtemperature situation occur.

Yet another object of the present invention is to provide a new and improved limit sensing device which is tamper-proof and which cannot be accidentally or intentionally reset once a limit reaching condition has been indicated.

Yet another object of the present invention is to provide a new and improved limit sensing device of the character described which is not dependent on electrical power and which is extremely rugged and thus the permanence of an indication is well-established regardless of harsh environmental conditions that may be encountered before or after a critical overtemperature situation has occurred.

Yet another object of the present invention is to provide a new and improved limit sensing device which does not require chemical interaction and which provides a dual capacity visual indication that an overtemperature limit has been reached.

Another object of the present invention is to provide a new and improved temperature limit sensing device and indicator which is small in size, has a low mass and which is useful for a variety of sensing applications and mounting methods and yet is relatively unsensitive to physical orientation, altitude changes, pressure or G-forces applied or chemically corrosive conditions.

Yet another object of the present invention is to provide a new and improved temperature limit sensing device that does not liberate materials into the surrounding environment resulting from its operation thereby creating potential hazards to innocent bystanders, buildings, vehicles, etc.

Yet another object of the present invention is to provide a new and improved limit sensing device that can be easily attached to existing tubular members without extensive threading, machining, or special installation means.

Yet another object of the present invention is to provide a new and improved limit sensing device wherein the device can be totally assembled without need to heat the fusible material through its fusing temperature range to become operational.

Yet another object of the present invention is to provide a new and improved limit sensing device that does not rely upon the integrity or bond of a solder-like joint which is difficult to inspect and may vary widely in strength and integrity for its operation and wherein performance is strictly related to the shear strength of the fusible material having no fluxes and little sensitivity to foreign contaminants.

Yet another object of the present invention is to provide a new and improved temperature limit sensing indicator which may also be utilized as an actuator for another system or device.

BRIEF SUMMARY OF THE INVENTION

The foregoing and other objects and advantages of the present invention are accomplished in a new and improved limit sensing indicator device for permanently indicating when a predetermined temperature limit has been reached in a fluid conduit or other device or element. The indicator device includes a housing and a saddle for mounting the unit on a conduit in a heat conductive relationship with the fluid therein. An indicator is mounted in the housing and is movable between an inner, retracted and an actuated, outwardly extended, indicating position projecting outwardly from the housing for indicating visually to an observer or inspector that a predetermined temperature limit has been reached. A strong biasing spring is provided for urging the indicator to move outwardly from the retracted position to an extended indicating position and a retainer in the form of an annulus or flat circular ring of fusible material is utilized for positively retaining the indicator within the housing in the retracted position against the biasing force of the spring until such time as a temperature limit is reached and the material of the retainer ring fuses or melts and changes from a solid to a liquid state thereby permitting the spring to forcefully move the indicator outwardly of the housing to the fully extended, indicating position. The spring is positioned to continuously exert a force or pressure on the indicator to maintain the indicator in the outwardly extended position after a temperature limit has been reached and the device is not resettable either accidentally or manually to hide the fact that an overtemperature condition has occurred.

BRIEF DESCRIPTION OF THE DRAWINGS

For a better understanding of the invention, reference, should be had to the following detailed description taken in conjunction with the drawings, in which:

FIG. 1 is a perspective view of a typical jet aircraft engine having a plurality of fluid lines and employing one or more limit sensing indicators in accordance with the present invention;

FIG. 2 is a greatly enlarged, fragmentary, transverse cross-sectional view taken along lines 2—2 of FIG. 1 illustrating a new and improved limit sensing indicator constructed in accordance with the present invention and shown as installed on a fluid line of a jet aircraft engine;

FIG. 2A is a greatly enlarged, fragmentary, transverse cross-sectional view similar to FIG. 2 but illustrating the limit sensing indicator in an extended actuated, operative position for visually indicating that a predetermined limit has been reached;

FIG. 3 is a greatly enlarged, fragmentary, transverse cross-sectional view similar to FIG. 2 but illustrating another embodiment of a limit sensing indicator in accordance with the present invention;

FIG. 3A is a greatly enlarged, fragmentary transverse cross-sectional view illustrating the limit sensing indicator of FIG. 3, in an extended, actuated, operative position after a limit has been reached;

FIG. 6 is a side elevational view of a limit sensing device in accordance with the present invention having a modified flat base plate for mounting on a flat mounting surface; and FIG. 7 is an elevational view of a limit sensing device in accordance with the present invention having a modified base structure and hose clamp type mounting arrangement.

DETAILED DESCRIPTION OF PREFERRED EMBODIMENTS OF THE PRESENT INVENTION

Figure 4:
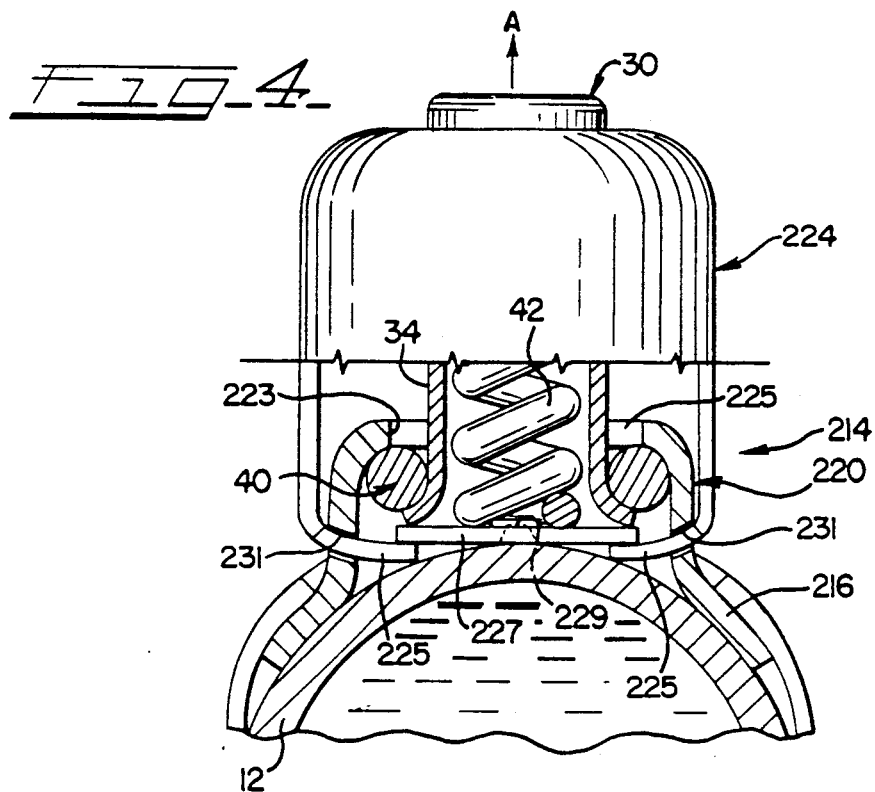
FIG. 4 is a fragmentary transverse cross-sectional view of yet another embodiment of a limit sensing device in accordance with the features of the present invention.

Referring now more particularly to the drawings, in FIG. 1 is illustrated a typical turbojet aircraft engine 10 having numerous hydraulic, oil, fuel, bleed air and other fluid conduits thereon, generally indicated, collectively, by the reference numeral 12. There are many applications including jet engine and other applications wherein it is critical that information be available to inspectors and the like, on whether a particular device or fluid has ever exceeded a specified operating temperature limit.

In many cases, it is desirable that a limit sensing indicator be tamper-proof so that it cannot be accidentally or intentionally reset and that the function of the indicator is not dependent on any type of electrical power.

In accordance with the present invention, a new and improved limit sensing indicator 14 is provided and the indicator is specially adapted to be mounted on a fluid line or conduit 12 in close heat transmitting relation therewith. The indicator 14 is especially adapted to provide a positive, visually observable indication that a predetermined or critical operating temperature limit has been reached, commonly in fluids such as oil, air, hydraulic, fuel, de-icer fluids, etc. The indicators 14 provide a positive and permanent, non-resettable indication which can easily be observed during preflight or on routine periodic inspections to accurately establish whether or not a specific temperature limit has been reached during a particular time period.

Referring now to FIGS. 2 and 2A, the indicator 14 includes a saddle 16 formed of heat conductive material (preferably a metal such as aluminum) having a pair of apertured mounting ears 16a on opposite ends of a curved, central section adapted to fit a fluid line 12 as illustrated. Alternatively, as shown in FIGS. 4 and 7, a "hose clamp" type installation can be provided where more convenient to the user, and as shown in FIG. 6, a flat mounting system can be provided for use on flat mounting surfaces. Suitable mounting bolts or cap screws 18 are utilized for securing the saddle base 16 permanently in position on a fluid line 12 so that tight, intimate heat transferring contact is well-established between the outer surface of the tubular conduit 12 and a metal base 22 of a housing or enclosure 20. The base 22 provides a flat, strong inner surface or floor and acts as a heat sink facing outwardly away from the center of the fluid flowing in the conduit 12.

The sensing indicator 14 includes a housing side wall 24 of generally cylindrical configuration projecting outwardly of the central floor 22 and further includes a frustoconically-shaped, outer end wall 26 defining a circular aperture 28 adapted to receive a movable limit indicator 30 of generally cup-shaped, cylindrical configuration. Preferably, the side wall 24 is attached to the floor 22 with tabs or the like and is also formed of metal such as aluminum or stainless steel. The end wall 26 is integral with the side wall 24 and is formed in a metal drawing operation. The indicator 30 is formed of metal such as aluminum and includes a circular outer end wall 32 and an integral cylindrical side wall 34 having a flared-out, annular free end portion 36 formed in a drawing operation at the inner, open end and maintained in close proximity to the floor surface 22 which acts as a conductive heat sink.

In accordance with the present invention, the indicator 14 includes a temperature sensitive, separate and discrete, metallic, fusible ring or annulus 40 normally contained within a lower portion of the housing 24 and adapted to retainingly engage the flared end portion 36 of the indicator 30 under normal conditions when the retainer annulus 40 is subject to a temperature below a preselected value or fusion temperature at which the metal of the ring will change from a solid state to a liquid state as the metal of the ring melts or fuses into liquid.

The visual indicator 30 is continuously biased outwardly by a relatively high strength coil spring 42 having an inner end coil bearing against the floor 22 and an outer end coil bearing against the inside surface of the indicator end wall 32. The spring 42 is formed of metal such as stainless steel and may have a spring constant of 4 lbs. per inch of deflection. The biasing force exerted by the spring 42 is aligned with the arrow "A" in coaxial alignment with the central axis of the helical coils of the spring 42 and with a central axis of the cylindrical wall of the housing 24 and the side wall 34 of the indicator 30, respectively.

In a solid state condition, the fusible retainer ring 40 is maintained in a lower position against the annular, flared end wall 36 of the indicator 30 by means of a metal, annular, cylindrical spacer 44 having a lower end engaging the retainer ring 40 and an upper end engaged against the inside surface of the frustoconically-shaped outer end wall or annulus 26 which serves as a stopping surface.

The spacer 44 is dimensioned with an internal diameter greater than the maximum outer diameter of the lower, flared end portion 36 of the indicator 30 so that ample clearance is provided when the fusible retainer ring 90 melts and permits the coil spring 42 to move the indicator 30 from the retracted position of FIG. 2 outwardly in the direction of arrow "A" to the fully extended, visual indicating position of FIG. 2A.

In the indicating position, the spring 42 still exerts a substantial positive outward force on the indicator 30 to positively maintain the indicator in the extended position. A sealing O-ring annulus 46 is provided around the opening 28 in the housing 24 to seal around the side wall 34 of the indicator 30 both in a retracted position (FIG. 2) and an extended position (FIG. 2A), thus maintaining the interior of the housing 24 in a sealed-off condition against external contaminants. The O-ring 46 may be compressed by the enlarged, flared end portion 36 of the indicator 30 when the indicator is extended and the inside surface of the frustoconical end wall 26 provides an end stop for limiting outward travel of the indicator 30 under the relatively large and continuing force of the bias spring 42. Fluorosilicon compounds capable of withstanding temperatures of 500° F. or more are suitable materials for the O-rings 46. Where the properties of O-rings are not considered optimum because of swelling properties when exposed to certain fluids, other types of seals, such as specially treated felt washers, U-cup gaskets, or the like, can also provide the desired protection to the internal cavity.

Once extended, the indicator 30 remains in the fully extended, indicating position and cannot be accidentally or inadvertently again reset into the retracted position because there is simply no appendage or other mechanism for retaining the indicator within the housing against the force of the coil spring 42 once the fusible ring 40 has melted.

The fusible retaining ring 40 is constructed of a selected metal alloy or other material having a precise melting temperature and when the melting point is reached, the spring 42 is effective to rapidly and centrally thrust the indicator 30 outwardly to the extended position. An outer surface portion of the indicator 30 may also be painted or treated to have a color different from closely adjacent portions thereof and/or different from the housing 24 to provide an additional or obvious secondary indication that an overtemperature or critical temperature has been reached.

A wide variety of commercial metal alloys are available for the retainer rings 40 having fuse points ranging from as low as 51° F. to as high as 1445° F. Thus, the temperature at which the overtemperature condition is indicated may be adjusted for different applications by selecting the appropriate alloy. Some of these alloys are manufactured and sold by the Indalloy Company as specialty alloys and meet various types of Federal specifications such as (QQ-S-571e). The annular shape of the retainer ring 40 and the annular flared end portion 36 of the indicator 30 cooperate to establish a large continuous ring-like area of close physical contact and this large contact area permits the use of a relatively high force level or strong spring 42. Even though the spring 42 is very strong, premature actuation of the indicator 30 is prevented as the shear strength of the fusible material of the retainer ring 40 begins to drop only when closely approaching the critical limit temperature (i.e., solidus temperature) because of the relatively large area of surface contact between the retainer ring 40 and the flared end portion 36 of the indicator 30. The large annular contact area also provides added strength for resisting vibration and thus, the limit sensing indicator 14 in accordance with the present invention has a high reliability in operation and a high accuracy for only giving actual or true indications in harsh environments. It is thus extremely rugged and dependable and will not give false indications.

The sensing device 14 cannot be reset once a critical overtemperature condition has been reached and the retainer ring 40 has fused. The interior of the housing 24 is sealed off permanently from outside environmental contaminants and the tight sealing provides an added measure of operational reliability without detriment to operational reliability. This also precludes particles of the fused retainer ring 40 escaping containment, where they might cause adverse effect on other equipment or environments.

Because the retainer ring is closely proximate to any heat source prevailing in the fluid contained within a conduit 12, the temperature gradients between the fusible ring 40 and the fluid in the conduit 12 are reduced and a more precision operation is achieved. Moreover, the device 14 may have a relatively small size and a relatively low mass, yet still be extremely reliable and accurate in operation while affording a variety of different mounting arrangements. In most applications, the device 14 can be readily applied externally with a minimum of special machining or fitting.

The devices 14 can be economically manufactured in quantity and are rugged and stable so as to be insensitive to changes in orientation, G-forces, altitude and/or pressures as well as greatly reduced temperatures which may be encountered in the atmosphere, space or in other industrial applications. The operator 30 may also be used as an actuator for triggering or operating other equipment and systems because the spring force may be rather large in relation to the size of the limit sensing device 14 because of the large contact area around the fusible retainer annulus 40.

The limit sensing indicator device 14 has no requirement for electrical power and is especially rugged in construction to withstand a hostile environment yet provide precision operability with no false overtemperature indications or failure of indication when overtemperature conditions do occur. The device 14 is completely sealed and is thus capable of resisting mechanical intrusion as well as chemical and environmental intrusion to meet most, if not all, of the desired attributes required for an aircraft application on jet engines and/or other types of engines, pumps and industrial applications that may be in need of temperature limit sensing indicators.

Referring now to FIGS. 3 and 3A, therein is illustrated another embodiment of a limit sensing indicator referred to generally by the reference numeral 114. Components of the indicator 114 that are identical to those in the previously described embodiment will bear the same reference numerals and only those components that have a modified form will be discussed herein in detail.

The indicator 114 includes a housing 124 having an enlarged diameter lower end portion 125 adapted to contain the fusible retaining ring, annulus 40 while in a solid or unmelted condition. Upwardly of the enlarged diameter lower end portion 125, the cylindrical body of the housing 124 has an internal diameter that is larger than the maximum outer diameter of the flared lower end portion 36 of the indicator 30 so that when the annulus 40 is melted upon reaching a critical temperature, no obstruction is encountered as the spring 42 rapidly thrusts the indicator 30 outwardly from the retracted position of FIG. 3 to the fully extended indicating position of FIG. 3A.

At the outer end, the modified housing 124 includes a radial, or flat annular end wall 126 defining an inner central aperture or opening 128 slightly larger than the outer diameter of the main body portion 34 of the indicator 30 so that the indicator may slide freely outwardly from the retracted position of FIG. 3 to the extended position of FIG. 3A. A sealing O-ring 46 is provided to positively seal between the housing aperture 128 and the surface 34 of the indicator 30, both while the indicator is in a retracted position and in a fully extended position. When fully extended, the spring 42 continuously urges the indicator 30 outwardly so that the flared end portion 36 of the indicator is forced against the O-ring 46 and retained by the annular end wall 126 which serves as a stop. The use of other equivalent or similar sealing methods described heretofore also apply to this arrangement of the device.

Operationally, the indicators 14 and 114 are similar and in each case when a critical temperature is reached, the annular retainer ring 40 fuses or melts to release the indicator 30 to move in the direction of arrow "A" under the force of the spring 42 to the extended, indicating position of FIG. 3A. The spring 42 maintains the indicator 30 in the extended position once the retainer ring 40 has fused and the indicator 30 cannot be reset, accidentally or intentionally by inward thrust.

Figure 5:
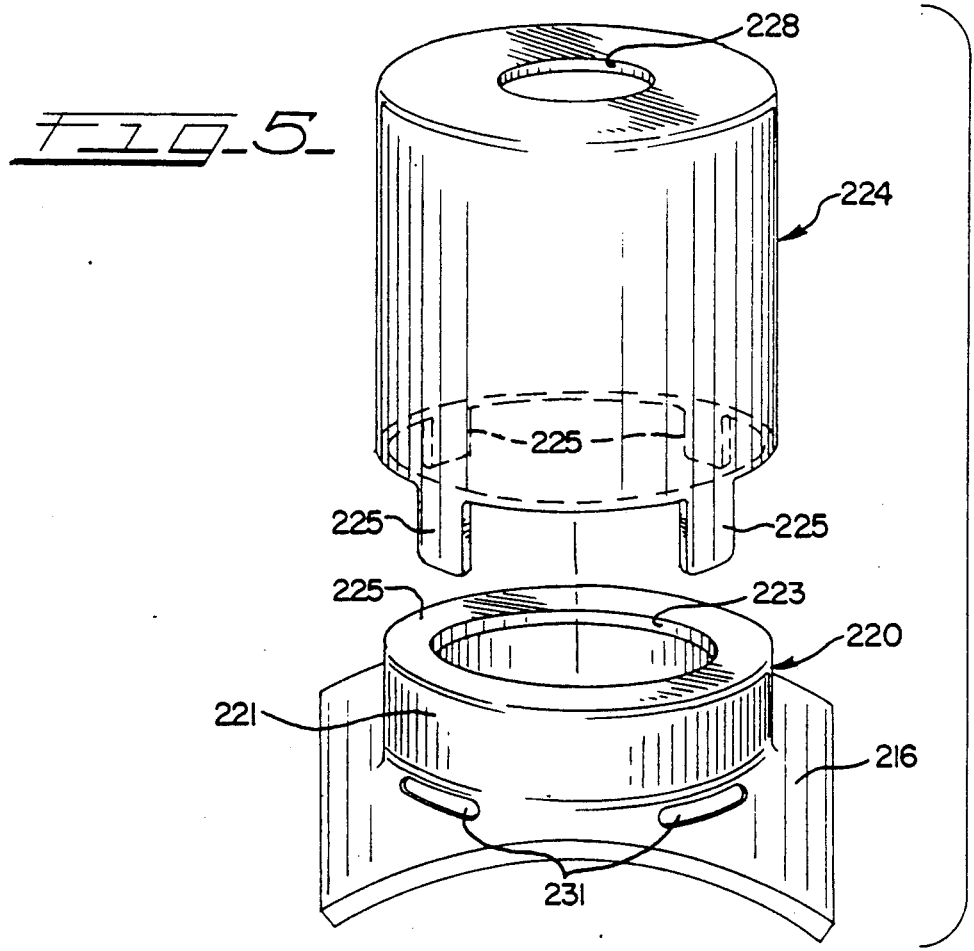
FIG. 5 is an exploded perspective view of a modified form of housing and base for a limit sensing device in accordance with the present invention.

Referring now to FIGS. 4 and 5, therein is illustrated yet another embodiment of the present invention comprising a temperature limit sensing and indicating device 214 having a modified housing 224 with a plurality of bendable mounting lugs 225 spaced equilaterally around a circular shaped inner end. The housing 224 is mounted on a modified base 220 having an upwardly projecting generally cylindrical boss 221 with a large central opening 223 in an upper end wall 225 which provides an annular stop surface engaging an annulus 40 of fusible metal of the type previously described. The base 220 includes an integral saddle structure 216 curved to fit in close heat conductive proximity to the outer surface of a fluid conducit 12.

The fusible annulus 40 is in direct contact with the annular upper end wall 225 of the base 220 which, in turn, is in direct contact with the fluid conduit 12 through the saddle structure 216 thus providing an excellent conductive heat path from the fluid in the conduit to the fusible metal of the annulus 40. A flared lower end portion 36 of the indicator 30 is in contact with the fusible annulus 40 which retains the indicator in the retracted position as shown in FIG. 4 against the biasing force of the spring 42 until the temperature of the annulus 40 reaches a limiting value whereupon the metal changes into liquid form and releases the indicator 30 which rapidly moves out to the extended position signalling that a limit temperature has been reached.

The lower end of the bias spring 42 is centered on a circular disc 227 having a raised boss 229 at the center. The disc 227 is held in place to compress the spring 42 and the housing 224 and base 220 are held together in assembled condition by the lugs 225 which are extended through slots 231 provided in the base and then bent upwardly against the underside of the disc 227.

Operation of the device 214 is similar to the operation of the devices 14 and 114, however, the device 214 may be secured to the fluid conduit 12 by means of a hose clamp type mounting bracket 250 having a pair of ears 252 which are interconnected with a nut and bolt assembly 254 as shown in FIG. 7. The bracket strap 250 is formed with a large slot or opening 258 designed to accommodate the base 20, 220 of a limit sensing device 14, 114, 214, etc., and strap portion around the opening is designed to overlay a curved segment 260 of a base which is pressed tightly against the surface of the fluid conduit 12 when the nut and bolt assembly 254 is tightened to draw the ears 252 closer together and exert tension on the strap of the "hose clamp" mounting bracket 250.

Referring now to FIG. 6, therein is illustrated a modified temperature limit sensor and indicator 314 having a modified base 320 with a flat mounting plate 360 adapted to be mounted on a flat surface 262 of an element 264 and held in place by fasteners such as cap screws 266 to assure a good heat conducting path between the element 264 and a fusible ring 40 contained in the indicator 314 which operates with substantially the same or similar type of components in substantially the same manner as the previous embodiments 14, 114 and 214, described herein.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A limit sensing device for permanently indicating when a predetermined temperature limit has been reached in a fluid conduit, comprising:

housing means including a heat conductive base adapted for mounting said device on said fluid conduit in a heat transfer relationship with said fluid and including an opening spaced away from said base;

indicator means in said housing means movable between an unactivated, first position inside said housing means and a second, activated position, projecting outwardly of said opening of said housing means for indicating that said temperature limit has been reached, said indicator means having an open inner end formed with a flange and a closed outer end portion closing said opening when said indicator means is in said first position;

biasing means mounted in said indicator means for urging said indicator means to move outwardly from said first position to said second position, said biasing means engaged between said base and said closed outer end portion of said indicator means;

retainer means in said housing means formed of a selected material that retains a solid state until said predetermined temperature limit is reached in said fluid, said retainer means interposed between said flange of said indicator means and said base of said housing means for securing said indicator means in said first position against the force of said biasing means with said flanged end adjacent said heat conductive base until said retainer means fuses into a liquid state upon said fluid reaching said temperature limit thereby releasing said indicator means for movement to said second position as urged by said biasing means;

said retainer means comprising a unitary ring of said selected fusible material mounted in a heat transfer relationship with heat conductive base adjacent said fluid conduit while in said solid state; and said flange limiting the outward movement of said indicator means relative to said opening in said housing means after said retainer means fuses into a liquid state.

2. The limit responsive device of claim 1, wherein:
   said housing means includes annular stop means around said opening therein for said indicator means, said stop means positioned to be engageable with said flange of said indicator means in said second position.

3. The limit responsive device of claim 2, wherein: said biasing means maintains engagement of said flange of said indicator means and said stop means when said indicator means is in said second position.

4. The limit responsive device of claim 2, wherein:
   said angular stop means includes an annular seal in sealing engagement with said indicator means around said opening of said housing means.

5. The limit responsive device of claim 1, wherein:
   said indicator means includes visual indicia on a portion thereof exteriorly of said housing means when said indicator means is in said second position for proving a visual indication that said limit has been reached.

6. The limit responsive device of claim 1, wherein:
   said visual indicia includes color means.

7. The limit responsive device of claim 2, wherein:
   said biasing means is positioned to maintain continuous pressure on said indicator means in both said first position and said second position.

8. The limit responsive device of claim 1, wherein:
   said biasing means is centered with respect to a central axis of said ring of fusible material.

9. In combination, an engine or other apparatus having at least one fluid conduit and a limit responsive device for indicating a predetermined temperature limit has been reached in said fluid, said device comprising:

housing means having a heat conductive base adapted to be secured in a heat transfer relationship on said fluid conduit and including an opening spaced from said base;

indicator means movable between a retracted position in said housing means closing said opening and an extended position projecting outwardly of said opening to be exposed externally of said housing means for indicating that said temperature limit has been reached, said indicator means having an open inner end formed with a flange and a closed outer end portion;

retainer means in said housing means in a heat transfer relationship with said heat conductive base for retaining said indicator means in said retracted position until said temperature limit is reached, said retainer means formed of a material which remains in a solid state until said temperature limit is reached and thereafter fuses into a liquid;

biasing means in said indicator means for moving said indicator means toward said extended position when said temperature limit is reached, said biasing means interposed between said base and said closed outer end portion of said indicator means;

said retainer means while in a solid state being interposed between said flange of said indicator means and said housing means for preventing the movement of said indicator means into said extended position and for retaining said flange in a close heat transfer relationship with said heat conductive base; and said flange of said indicator means positioned adjacent said opening after said retainer means has fused into a liquid state and interacting with said housing means to prevent said indicator means for moving out of said extended position.

10. The combination of claim 9, wherein:
    said retainer means is changeable from a solid to a fluid state when said predetermined limit is reached for releasing said indicator means for movement from said retracted to said extended indicating position as urged by said biasing means.

11. The combination of claim 10, wherein:
said opening is aligned to permit said indicator means to move outwardly to said extended position; and
said combination includes stop means for limiting the extension of said indicator means away from said housing means while in said extended position.

12. The combination of claim 11, including:
seal means around said opening of said housing means and said indicator means for sealing off the interior of said housing means.

13. The combination of claim 9, wherein:
said flange is engageable with said retainer means while in a solid state for securing said indicator means in said retracted position, and wherein said flange is engageable to limit outward movement of said indicator means relative to said housing means when said indicator means is moved by said biasing means to said extended position when said temperature limit has been reached.

14. The combination of claim 9, wherein:
said indicator means includes a hollow plunger having a wall closing an outer end and said flange includes an annular flange around an inner end of said plunger for engaging said retainer means while in a solid state for retaining said plunger in said retracted position.

15. The combination of claim 14, wherein:
said housing means includes a base adjacent said fluid conduit and said outer end wall of said indicator means is spaced from said base for movement from said retracted position to said extended position of said plunger; and
said biasing means comprises spring means in said plunger extending between said base and said outer end wall for biasing said indicator means toward said extended position.

16. The combination of claim 15, wherein:
said housing means includes an outer annular wall spaced outwardly of said base and formed around an opening for receiving said plunger for movement from said retracted position toward said extended position wherein said end wall of said plunger is spaced outwardly of said annular wall of said housing means.

17. The combination of claim 16, wherein:
said retainer means comprises an annular ring formed of material that is fusible into liquid state upon reaching said predetermined temperature limit and is normally engaged with said annular flange of said plunger while in a solid state before said temperature limit is reached to retain said plunger in said retracted position against the force exerted by said spring means tending to move said plunger toward said extended position.

18. The combination of claim 17, wherein:
said spring means acts against said annular flange of said plunger to retain said plunger in said outwardly extended position relative to said housing means after said ring has fused.

19. A limit sensing device for permanently indicating when a predetermined temperature limit has been reached in a monitored area, comprising:
housing means including a heat conductive base with means for mounting said device in a heat transfer relationship with said monitored area and including an opening in a wall spaced from said base;
indicator means mounted in said housing means for movement between an inside, unactivated, first position closing off said opening and a second, activated position, wherein an outer end portion is positioned to project outwardly of said housing means through said opening for indicating when said temperature limit has been reached, said indicator means having a flange adjacent an inner end normally maintained in a heat transfer relationship with said base while said indicator means is in said first position;
biasing means mounted in said indicator means having one end bearing on said outer end portion thereof for urging said indicator means to move from said first position to said second position and having an opposite end bearing on said base; and
retainer means formed of material capable of remaining in a solid state condition at temperature levels below said predetermined temperature limit and interposed while in said solid state condition between said flange of said indicator means and said housing means for securing said indicator means in said first position with said flange against said base against the force of said biasing means, said flange engaging said retainer means with a complete ring of contact around said biasing means while in said solid state condition, said retainer means becoming fused into a liquid state upon reaching said temperature limit and no longer interposed between said housing means and said indicator means to prevent movement thereof from said first position to said second position;
said flange positioned by said retainer means in a solid state condition to maintain said indicator means in said first position, and said flange cooperating with said housing means around said opening to limit further outward travel of said indicator means upon movement toward said second position against the force of said biasing means which maintains said indicator means in said second position.

20. The limit responsive device of claim 19, wherein:
said retainer means comprises an annulus of said fusible material mounted in said housing means adjacent said monitored area.

21. The limit responsive device of claim 20, wherein said fusible material is a metal alloy and wherein said predetermined temperature is determined by the composition of said metal alloy.

* * * * *